(12) United States Patent
Ogawa

(10) Patent No.: US 8,711,468 B2
(45) Date of Patent: Apr. 29, 2014

(54) DISPLAY SHEET, DISPLAY DEVICE, AND ELECTRONIC APPARATUS

(75) Inventor: Satoshi Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 13/240,199

(22) Filed: Sep. 22, 2011

(65) Prior Publication Data

US 2012/0099182 A1  Apr. 26, 2012

(30) Foreign Application Priority Data

Oct. 22, 2010 (JP) .................................. 2010-237887

(51) Int. Cl.
*G02B 26/00* (2006.01)
*G02B 26/02* (2006.01)
*G02F 1/17* (2006.01)

(52) U.S. Cl.
CPC .................................. *G02B 26/026* (2013.01); *G02F 1/172* (2013.01)
USPC ............ 359/296; 359/297; 359/237; 345/107

(58) Field of Classification Search
USPC .................... 359/295–297, 237, 245; 345/107
See application file for complete search history.

(56) References Cited

U.S. PATENT DOCUMENTS

| | | | |
|---|---|---|---|
| 6,113,810 A | 9/2000 | Hou et al. | |
| 6,844,958 B2 | 1/2005 | Kawai | |
| 7,499,211 B2 * | 3/2009 | Suwabe et al. | ................. 359/296 |
| 7,656,576 B2 | 2/2010 | Suwabe et al. | |
| 2003/0086149 A1 | 5/2003 | Kawai | |
| 2007/0268244 A1 * | 11/2007 | Chopra et al. | ................. 345/107 |
| 2008/0112040 A1 * | 5/2008 | Suwabe et al. | ................. 359/296 |
| 2008/0136772 A1 * | 6/2008 | Minami | ........................ 345/107 |

FOREIGN PATENT DOCUMENTS

| | | |
|---|---|---|
| JP | A-08-510790 | 11/1996 |
| JP | A-2003-140202 | 5/2003 |
| JP | A-2004-126197 | 4/2004 |
| JP | A-2006-071909 | 3/2006 |
| JP | A-2007-192880 | 8/2007 |
| JP | A-2008-139803 | 6/2008 |
| JP | A-2008-181058 | 8/2008 |
| JP | A-2008-216321 | 9/2008 |
| JP | A-2009-003179 | 1/2009 |
| JP | A-2010-044114 | 2/2010 |
| WO | WO 94/28202 A1 | 12/1994 |

\* cited by examiner

*Primary Examiner* — Ricky Mack
*Assistant Examiner* — Danielle Manikeu
(74) *Attorney, Agent, or Firm* — Oliff PLC

(57) ABSTRACT

A display device includes: a substrate provided on a side of the display surface; a counter substrate disposed to face the substrate; a display layer provided between the substrate and the counter substrate and filled with a dispersion liquid formed of a dispersion medium in which white particles and black particles charged with polarities opposite to each other are dispersed; and a particle constrained layer provided in the display layer, and suppresses the white particles and the black particles from moving in an in-plane direction of the display layer, while allowing the particles to move in the thickness direction of the display layer. In the display device, a particle constrained layer is provided to be separated from the substrate.

15 Claims, 10 Drawing Sheets

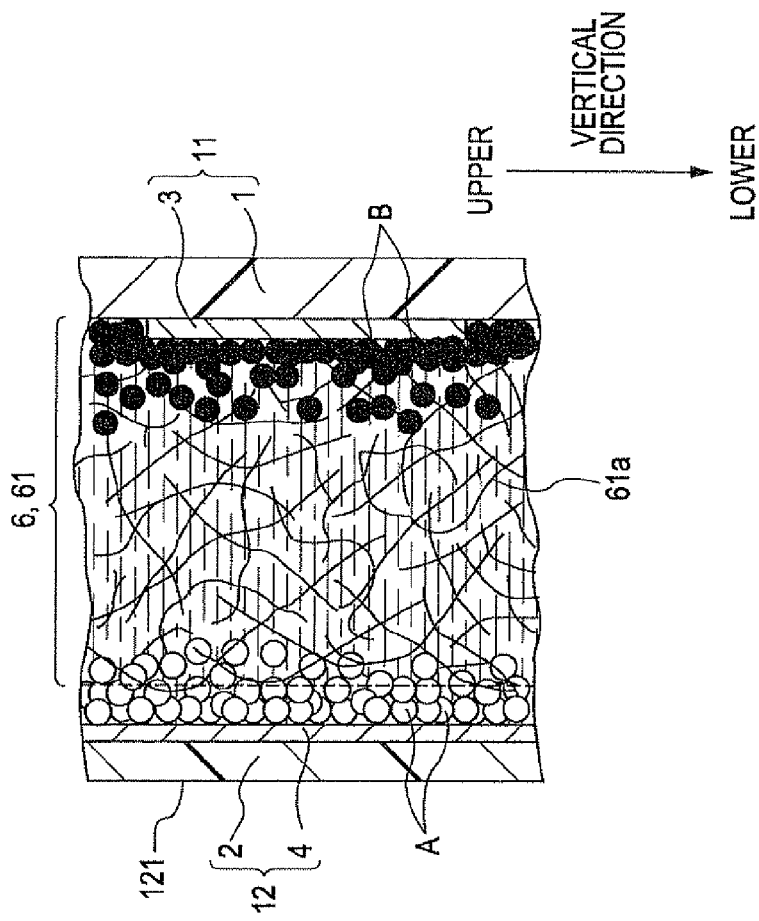
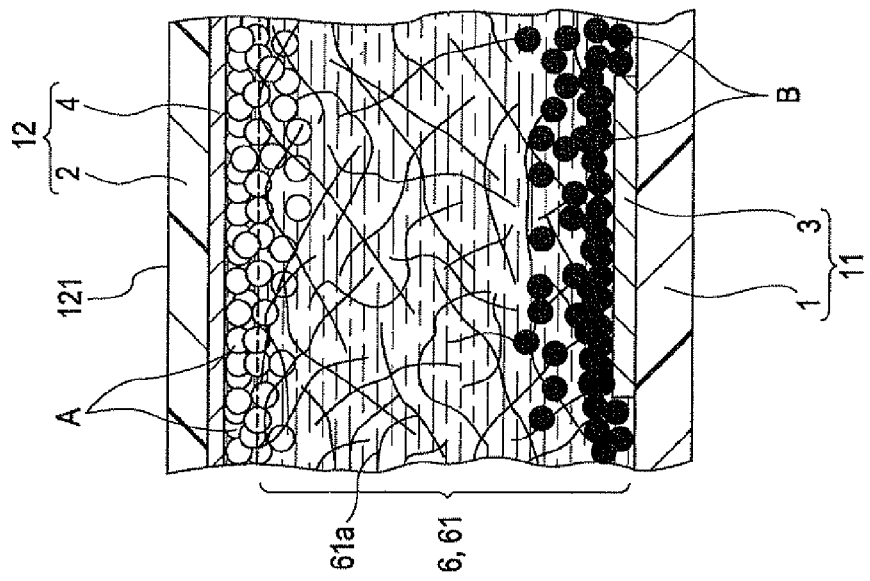

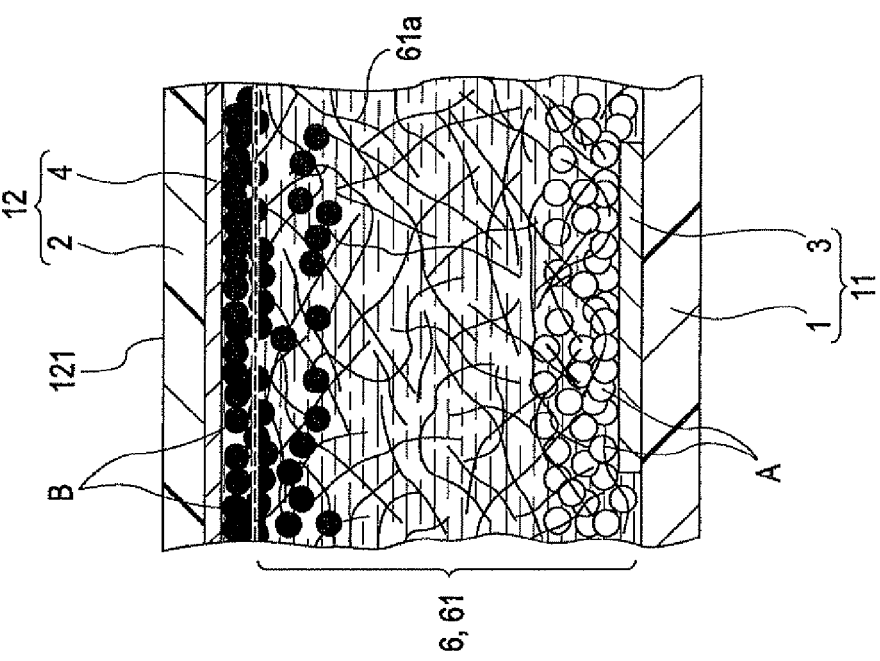
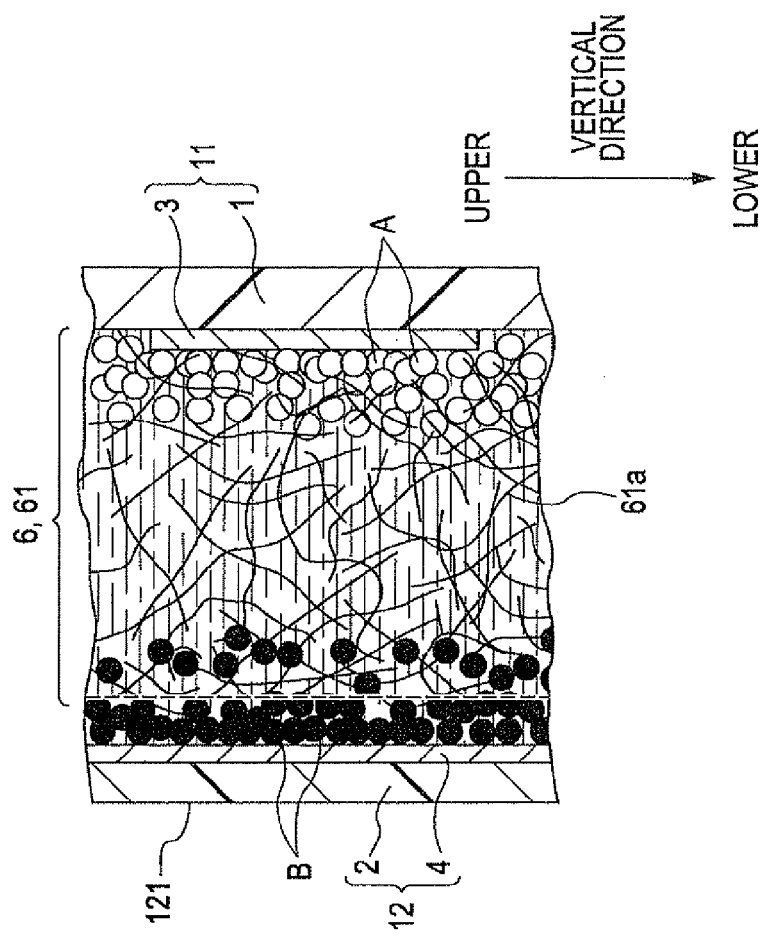

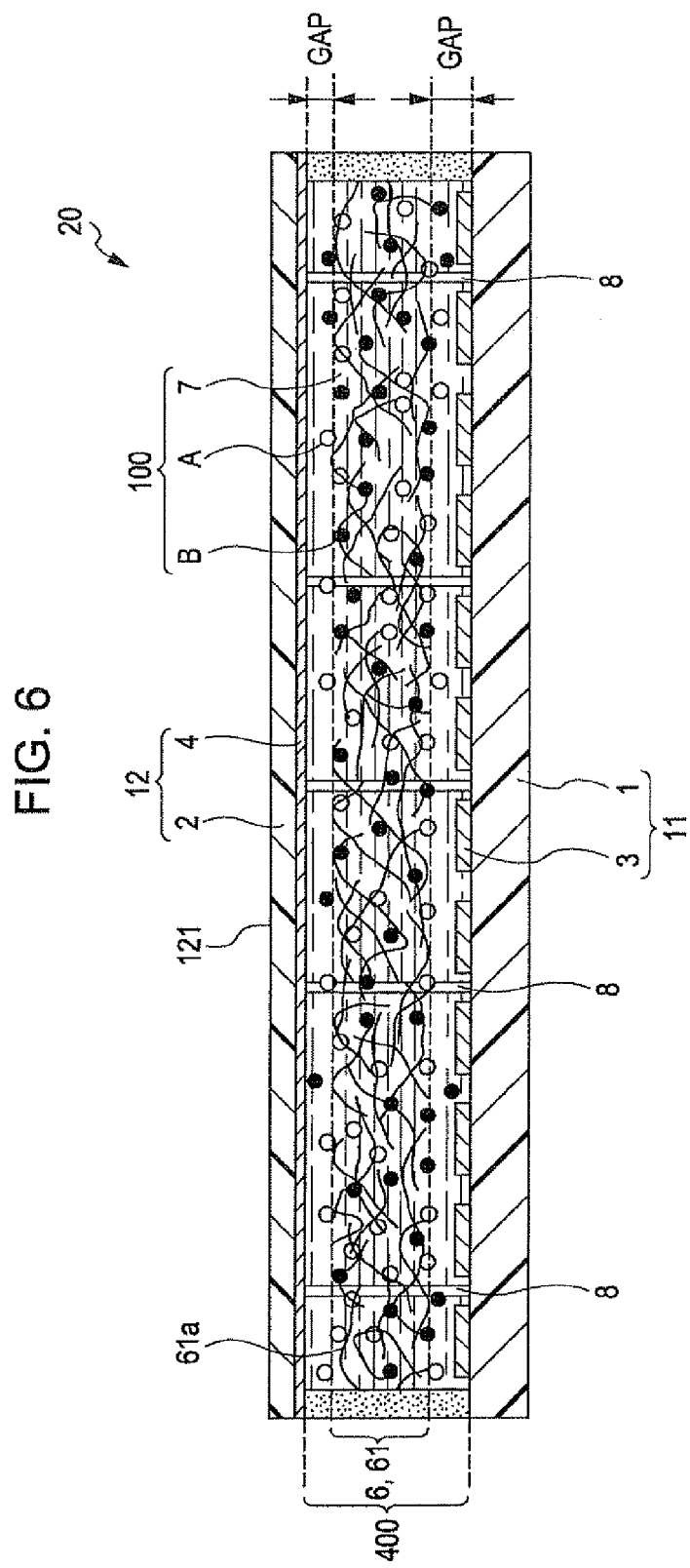

DISPLAY SHEET, DISPLAY DEVICE, AND ELECTRONIC APPARATUS

BACKGROUND

1. Technical Field

The present invention relates to a display sheet, a display device, and an electronic apparatus.

2. Related Art

For example, as a configuration of an image display section of an electronic paper, an electrophoresis display which uses an electrophoresis migration of particles is known (for example, refer to JP-A-2010-44114). The electrophoresis display is excellent in portability and conservation of electric power, and is particularly applied as an image display section of electronic paper.

The electrophoresis display includes a pair of electrodes which are disposed to face each other and a display layer which is provided therebetween. The display layer is filled with, for example, a dispersion liquid which is composed of a liquid phase dispersion medium in which positively charged white particles and negatively charged black particles are dispersed. The electrophoresis display is configured such that a voltage is applied between the pair of electrodes to electrophorese the white particles and the black particles in a desired direction, so that a desired image is displayed.

Here, the configuration of the display layer may be roughly classified into: a "partition type" in which the display layer is divided into a plurality of cells by partitions and each of the cells is filled with the dispersion liquid as described in JP-A-2010-44114; a "micro capsule type" in which a plurality of micro capsules which seal the dispersion liquid are disposed and are fixed by binders as described in JP-A-2003-140202, and a "liquid crystal type" in which the display layer is formed as a space (that is, which is not divided by the partitions and the like) in which the dispersion liquid is filled as described in JP-T-8-510790.

However, in the "partition type", there is a problem in that an effective display area (which is an area capable of changing a display color) in a display surface is reduced due to the partitions, and display characteristics are degraded. In addition, in the "micro capsule type", there is a problem in that a gap is generated between adjacent micro capsules reducing the effective display area in the display surface, such that the display characteristics are degraded, or when a voltage is applied between the pair of electrodes, leakage current occurs due to the binders, such that the display characteristics are degraded. In addition, in the "liquid crystal type", almost the entire area on the display surface can be used as the effective display area. However, there is a problem in that, for example, when the display is erected like a book, the white particles and the black particles move (sink) on the lower side in the vertical direction by their own weight and a display image may not be maintained, such that reliability is decreased.

SUMMARY

An advantage of some aspects of the invention is to provide a display sheet which has high reliability and can exhibit excellent display characteristics, a display device which is provided therewith, and an electronic apparatus with high reliability.

The advantage of some aspects of the invention is achieved with the following.

According to a first aspect of the invention, there is provided a display sheet including: a first substrate which is provided on a side of a display surface; a second substrate which is disposed to face the first substrate; a display layer which is provided between the first substrate and the second substrate and filled with a dispersion liquid in which at least one kind of particle is dispersed in a dispersion medium, the particles being charged positively or negatively; and a particle constrained layer which is provided in the display layer, wherein the particle constrained layer is provided to be separated from the first substrate.

With this configuration, the display sheet which has high reliability and can exhibit excellent display characteristics can be provided.

In the display sheet, it is preferable that a separated distance between the particle constrained layer and the first substrate be equal to or more than one time and equal to or less than five times an average particle diameter of the particles.

With this configuration, since the particle constrained layer can be covered by the particles collected on the side of the first substrate, the display characteristics are improved further.

In the display sheet, it is preferable that the particle constrained layer be provided to be separated from the second substrate.

With this configuration, the particles collected on the side of the second substrate can be made to move in an in-plane direction of the display layer. For this reason, for example, when a strong impact is applied to the device or it is kept in the same attitude for a long time such that deviation of the particles occurs, it becomes easy to uniformly disperse the particles back into the center of the display layer again.

In the display sheet, it is preferable that a separated distance between the particle constrained layer and the second substrate be equal to or more than one time and equal to or less than five times an average particle diameter of the particles.

With this configuration, the particles collected on the side of the second substrate can be made to move in an in-plane direction of the display layer. For this reason, for example, when a strong impact is applied to the device or it is kept in the same attitude for a long time such that deviation of the particles occurs, it becomes easy to uniformly disperse the particles back into the center of the display layer again.

In the display sheet, it is preferable that a fixing member which be provided in the display layer and fixes the particle constrained layer to the first substrate is included.

With this configuration, the state where a gap between the particle constrained layer and the first substrate is formed can be maintained further more surely.

In the display sheet, it is preferable that the fixing member be in a pillar shape in such a manner as to be extended in a thickness direction of the display layer.

With this configuration, the fixing member serves as a reinforcing member for reinforcing strength of the display layer, and durability of the device is improved.

In the display sheet, it is preferable that the number of fixing members per unit area of the display layer be larger in the center portion rather than in a peripheral portion of the display layer.

With this configuration, while the fixing members are disposed in a balanced manner and the display characteristics are maintained, durability of the device can be improved.

In the displays sheet, it is preferable that the particle constrained layer include at least one of a porous body, a network structure body, and a fiber aggregate.

With this configuration, the particle constrained layer is simply configured.

In the displays sheet, it is preferable that the particle constrained layer suppress the particles from moving in an in-plane direction of the display layer while allowing the particles to move in a thickness direction of the display layer.

With this configuration, more excellent display characteristics can be exhibited.

In the displays sheet, it is preferable that the dispersion liquid include first particles, which are charged positively or negatively and second particles which are charged with polarities opposite to the first particles, and average particle diameters of the first particles and the second particles are substantially the same.

With this configuration, since the same effect can be obtained regarding any one of the first particles and the second particles, the display characteristics are improved further.

According to a second aspect of the invention, there is provided a display device including the display sheet of the invention.

With this configuration, the display device with high reliability is obtained.

According to a third aspect of the invention, there is provided an electronic apparatus including the display device of the invention.

With this configuration, the display device with high reliability is obtained.

BRIEF DESCRIPTION OF THE DRAWINGS

The invention will be described with reference to the accompanying drawings, wherein like numbers reference like elements.

FIGS. 4A and 4B are cross-sectional views illustrating driving and effects of the display device shown in FIG. 1.

FIGS. 5A and 5B are cross-sectional views illustrating driving and effects of the display device shown in FIG. 1.

FIG. 6 is an expanded sectional view illustrating a display device according to a second embodiment of the invention.

DESCRIPTION OF EXEMPLARY EMBODIMENTS

Hereinafter, a display sheet, a display device, and an electronic apparatus according to the invention will be described in detail on the basis of exemplary embodiments which are shown in the accompanying drawings.

1. Display Device

First, a display device in which a display sheet according to the invention is assembled will be described.

First Embodiment

Figure 1:
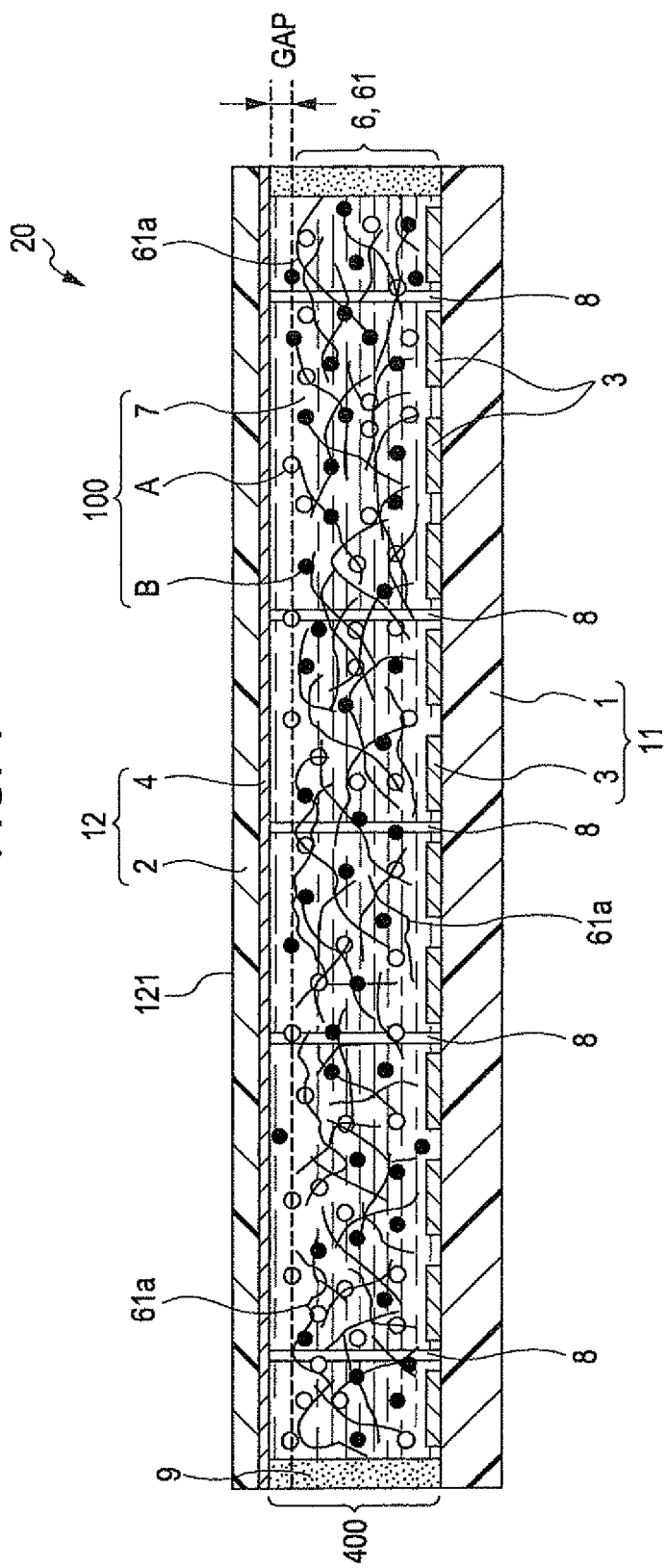
FIG. 1 is a cross-sectional view illustrating a display device according to a first embodiment of the invention.
Figure 2:
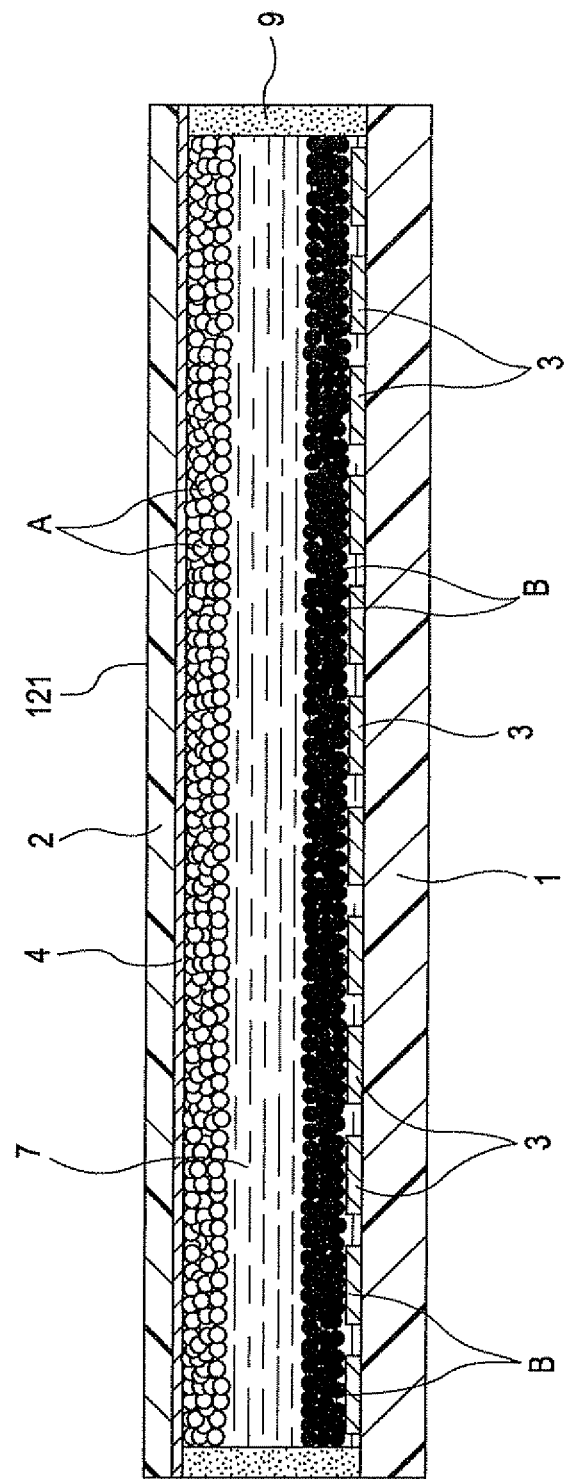
FIG. 2 is a diagram illustrating a problem of a display device in the related art.
Figure 3:
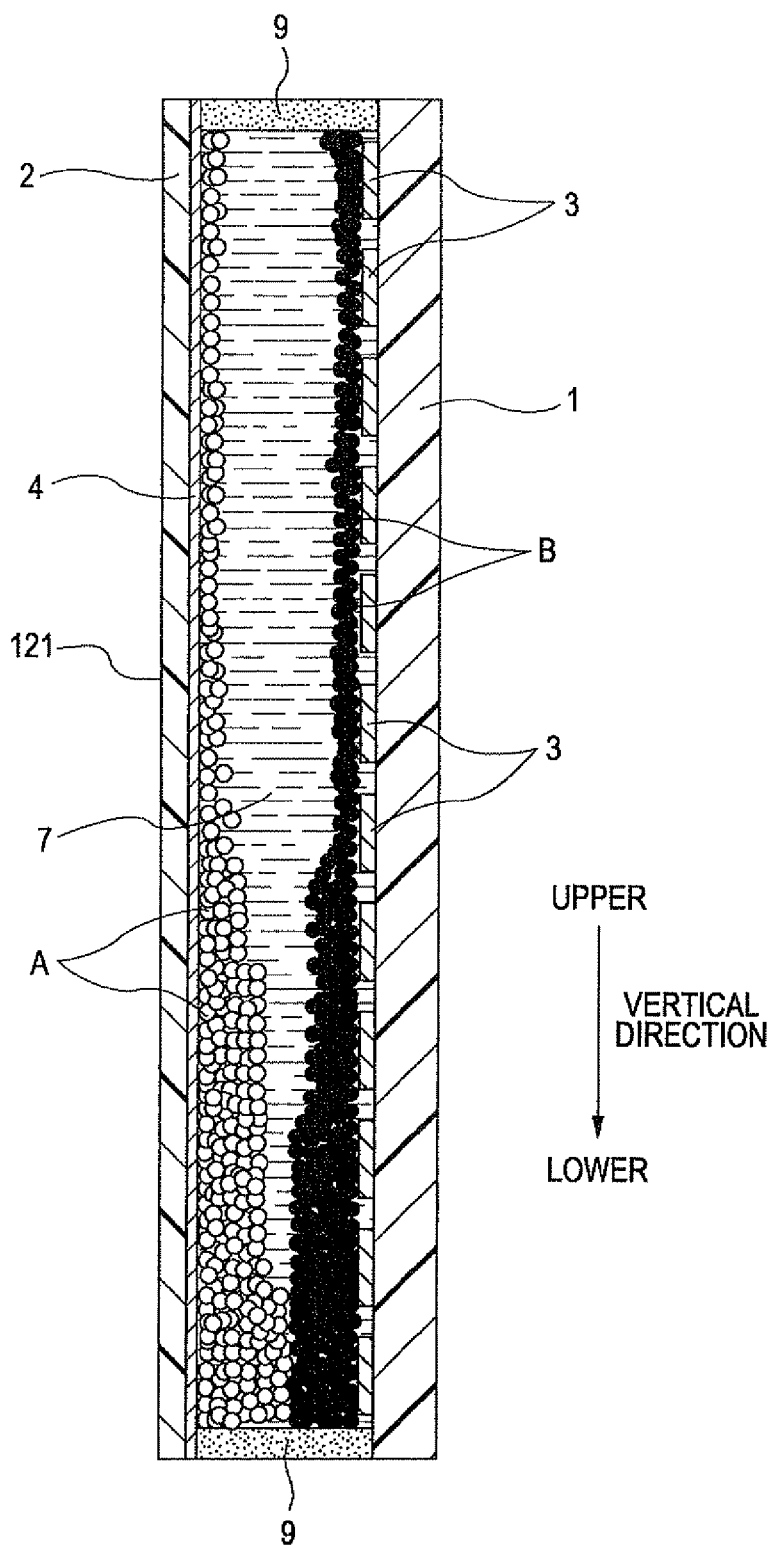
FIG. 3 is a diagram illustrating a problem of a display device in the related art.

FIG. 1 is a cross-sectional view illustrating the display device according to the first embodiment of the invention; FIGS. 2 and 3 are diagrams illustrating problems of the display device in the related art; and FIGS. 4A, 4B, 5A, and 5B are cross-sectional views each illustrating driving and effects of the display device shown in FIG. 1. Further, in the following, for convenience of explanation, the upper side and the lower side are denoted by "UPPER" and "LOWER" in FIGS. 1 to 6, respectively.

The display device (the display device according to the invention) 20 shown in FIG. 1 is an electrophoresis display device which displays desired images using electrophoresis of particles. The display device 20 includes a display sheet (front plane) 21 and a circuit substrate (back plane) 22.

As shown in FIG. 1, the display sheet 21 includes a substrate (first substrate) 12 which includes a tubular base section 2 and a second electrode 4 provided on the bottom surface of the base section 2, and a display layer 400 which is provided on the substrate 12 and filled with a dispersion liquid 100. In the display sheet 21, an upper surface of the substrate 12 forms a display surface 121. Further, in the following, the display surface 121 is considered as an area which overlaps with the upper surface of the substrate 12 in plane view of the display device 20 except the other areas (for example, an area overlapping with a sealing section 9 to be described later).

On the other hand, the circuit substrate 22 includes a counter substrate 11 which includes a tabular base section 1 and a plurality of first electrodes 3 provided on an upper surface of the base section 1, and a circuit (not shown) which is provided in the counter substrate 11. The circuit includes, for example, TFTs (switching elements) which are arranged in a matrix shape, gate lines and data lines which are formed to correspond to the TFTs, a gate driver which applies a predetermined voltage to the gate lines, a data driver which applies a predetermined voltage to the data lines, and a control section which controls the gate lines and the data lines.

In the display device 20, the counter substrate 11 also serves as the second substrate of the display sheet 21.

Hereinafter, the configuration of each section will be described sequentially.

The base section 1 and the base section 2 each include a sheet shape (tabular) member, and serve to support and protect each member which is disposed therebetween. Each of the base sections 1 and 2 may be flexible or solid, but the flexible one is preferable. By using the flexible base sections 1 and 2, the flexible display device 20, that is, the display device 20 which is useful for the establishment of an electronic paper can be obtained.

When each of the base sections (substrate layers) 1 and 2 is flexible, as a constituent material thereof, for example, polyester such as PET (polyethylene terephthalate) and PEN (polyethylene naphthalate), polyolefin such as polyethylene, various kinds of thermoplastic elastomers such as a modified polyolefin, polyimide, thermoplastic polyimide, polyether, polyether ether ketone, polyurethane-based, chlorinated polyethylene-based, or a copolymer composed mainly thereof, a blend body, and a polymer alloy are included. Further, a mixture containing one, two or more kinds thereof may be used.

An average width of each of the base sections 1 and 2 is appropriately set by the constituent materials, applications and the like. When the base sections are flexible, the average width preferably ranges, but is not limited to, from about 20 μm to 500 μm, and more preferably from about 25 μm to 250 μm. Therefore, while achieving a balance between flexibility and strength of the display device 20, miniaturization (in particular, small thickness) of the display device 20 can be achieved.

The surfaces of these base sections 1 and 2 facing the display layer 400, that is, the upper surface of the base section 1 and a lower surface of the base section 2 are provided with the first electrodes 3 and the second electrode 4 which are in a film shape, respectively. In the embodiment, the second electrode 4 becomes a common electrode, and the first electrodes 3 become separate electrodes (pixel electrodes connected to a TFT) which are divided in a matrix shape. In the display device 20, an area in which one of the first electrodes 3 is overlapped with the second electrode 4 constitutes one pixel.

As constituent materials of the electrodes 3 and 4, the materials are not particularly limited as long as they have substantial conductivity. For example, a metal material such as an alloy including gold, silver, bronze, aluminum or a combination thereof, a carbon-based material such as carbon black, an electronically conductive polymer material such as polyacetylene, polyfluorene, or derivatives thereof, an ion conductive polymer material which is composed of an ionic material such as NaCl, $Cu(CF_3SO_3)_2$ dispersed in matrix resin such as polyvinyl alcohol and polycarbonate, and various conductive materials such as a conductive oxide material, for example, an indium oxide (IO), an indium tin oxide (ITO), and a fluorine-doped tin oxide (FTO) are exemplified. Further, the constituent materials may be used by combination of one, two or more kinds of above-mentioned materials.

In addition, an average width of each of the electrodes 3 and 4 is appropriately set by the constituent materials, applications and the like. The average width preferably ranges, but is not limited to, from about 0.01 μm to 10 μm, and more preferably from about 0.02 μm to 5 μm.

Here, among the respective base sections 1 and 2 and the respective electrodes 3 and 4, the base section and the electrode which are disposed toward the display surface 121 have optical transparency, that is, they are substantially transparent (colorless and transparent, colored and transparent, or translucent). In the embodiment, since the surface of the substrate 12 forms the display surface 121, at least the base section 2 and the second electrode 4 are substantially transparent. Therefore, the state of white particles A and black particles B in the dispersion liquid 100, that is, information (images) displayed in the display device 20 can be easily identified from the display surface 121 by viewing.

The sealing section 9 is provided between the substrate 12 and the counter substrate 11 along the peripheral portion. With the sealing section 9, the display layer 400 is sealed air-tightly. For this reason, the dispersion liquid 100 is prevented from leaking to the outside of the display device 20, and water is prevented from permeating the display device 20. Therefore, degradation in display performance of the display device 20 can be prevented further more surely.

As a constituent material of the sealing section 9, various kinds of resin materials, for example, but not limited to, thermoplastic resin such as arcrylic-based resin, urethan-based resin and olefin-based resin, and thermosetting resin such as epoxy-based resin, melamine-based resin, and phenol-based resin are included. Further, the constituent material may be used by combination of one, two or more kinds of above-mentioned materials.

The display layer 400 is filled with the dispersion liquid 100. Furthermore, the display layer 400 is provided with a particle constrained layer 6 which is fixed by pillar members 8.

The dispersion liquid 100 is made of the white particles (the first particles) A and the black particles (the second particles) B which are charged with the opposite polarities and dispersed in the dispersion medium 7.

The dispersion medium 7 which has a relatively high insulation property is preferably used. As such a dispersion medium 7, for example, various kinds of water (for example, distilled water, purified water, etc.), alcohols such as methanol, cellosolves such as methyl cellosolve, esters such as methyl acetate, ketones such as acetone, aliphatic hydrocarbons such as pentane (liquid paraffin), alicyclic hydrocarbons such as cyclohexane, aromatic hydrocarbons such as benzene, halogenated hydrocarbons such as methylene chloride, aromatic heterocycles such as pyridine, nitriles such as acetonitrile, amides such as N,N-dimethylformamide, carboxylate salt, silicone oil, or other various kinds of oils are included. Further, a single or a mixture of the above-mentioned materials can be used.

Above all, as the dispersion medium 7, the aliphatic hydrocarbons (liquid paraffin) or the silicon oil are preferable to be used as a main component. It is preferable that the dispersion medium 7 which is based on the liquid paraffin or the silicon oil increases the effect of inhibiting the coaggregation of the white particles A and the black particles B. Therefore, it is possible to prevent or suppress more surely that the display performance of the display device 20 is degraded over time. In addition, liquid paraffin or silicon oil is preferable in the sense that it is excellent in weather resistance'due to having no unsaturated bonds and safety is also high.

In addition, in the dispersion medium 7, for example, a surface active agent such as electrolyte and alkenyl succinic acid ester (anionic or cationic), a charge controlling agent made of particles such as metal soap, resin materials, rubber materials, oils, varnishes and compounds, a dispersive agent such as a silane-based coupling agent and various kinds of additive agents such as a lubricant agent, and a stabilizing agent may be added as needed. In addition, when the dispersion medium 7 is stained, various kinds of dyes such as anthraquinone-based dye, azo-based dye, and indigoid-based dye may be dissolved in the dispersion medium 7 as needed.

The white particles A and the black particles B are charged and capable of being electrophoresed in the dispersion medium 7 by the operation of an electric field. As the white particles A and the black particles B, any particles may be used as long as the particles are charged, and at least one kind of, but not limited to, pigment particles, resin particles or the composite particles thereof is preferably used. These particles are easy to manufacture, and the charging control can be performed with relative ease.

As a pigment composing pigment particles, for example, a black pigment such as aniline black, and carbon black, titanium black, chromous acid copper, a white pigment such as titanium oxide and antimony oxide, azo-based pigment such as mono azo, yellow pigment such as isoindolinone and chrome yellow, a red pigment such as quinacridone red and chrome vermilion, a blue pigment such as phthalocyanine blue and indanthrene blue, and a green pigment such as phthalocyanine green are included. Further, the constituent material may be used by combination of one, two or more kinds of above-mentioned materials.

In addition, as a resin material composing resin particles, for example, arcrylic-based resin, urethan-based resin, urea-based resin, epoxy-based resin, polystyrene, and polyester are included. Further, the constituent material may be used by combination of one, two or more kinds of above-mentioned materials.

In addition, as the composite particles, for example, pigment particles of which the surfaces are coated with a resin material or other pigments, resin particles of which the surfaces are coated with a pigment, and a mixture in which a pigment is mixed with a resin material at a proper composition ratio.

As the particles of which surfaces of pigment particles are coated by other pigments, for example, the surface of titanium oxide particles is coated by silicon oxide or aluminum oxide may be included, and such particles are preferably used as the white particles A. In addition, carbon black particles or the particles of which surfaces are coated are preferably used as the black particles B.

In addition, the shapes of the white particles A and the black particles B may be preferably, but not limited to, a circle shape. In addition, an average particle diameter of each of the white particles A and the black particles B preferably ranges from, but is not limited to, 10 nm to 500 nm, and more preferably from 20 nm to 300 nm. When the average particle diameters of the white particles A and the black particles B are less than 10 nm, sufficient chromaticity may not obtained and the contrast reduces, such that the display becomes unclear in many cases. On the contrary, when the average particle diameters of the white particles A and the black particles B exceed 300 nm, a coloring degree of the particle itself is necessary to be high more than it is required; a used amount of the pigment increases; the particles are hard to move fast in a portion where a voltage is applied for displaying; or a response speed is reduced in many cases.

Further, an average particle diameter of the white particles A and the black particles B represents a volume-average particle diameter which is measured by a dynamic light scattering particle size distribution analyzer (for example, Product Name: LB-500, made by Horiba, Ltd.).

In the embodiment, the average particle diameters of the white particles A and the black particles B are set to be substantially the same to each other.

Next, before undertaking the particle constrained layer 6, problems that may occur when the particle constrained layer 6 is omitted will be described.

When a predetermined voltage is applied between the electrodes 3 and 4, as shown in FIG. 2, the white particles A can be collected on the side of the second electrode 4 (substrate 12) of the display layer 400, and the black particles B can be collected on the side of the first electrode 3 (counter substrate 11) of the display layer 400. Therefore, it comes to be a state in which a white color is displayed in the area of the display surface 121.

Here, the display device 20 is assumed to be vertically viewed like a book in hand. Then, as shown in FIG. 3, when the display device 20 without the particle constrained layer 6 is vertically held like a book, particles contacted with the second electrode 4 among the white particles A or particles positioned in the vicinity of the second electrode 4 are held in that position by adsorption force of the second electrode 4. However, since the adsorption force of the second electrode 4 does not operate on particles which are relatively separated from the second electrode 4 (or the operating adsorption force is weak), the particles move (sink) toward the lower side in the vertical direction by their own weight. The black particles B are also the same.

When this type of phenomenon occurs, deviation of the white particles A and the black particles B occurs in the display layer 400, and an image displayed in the display surface 121 becomes an uneven image. In addition, because of movement (sinking) of the white particles A, high reflectance may not be obtained in a pixel where the number of the white particles A has decreased, such that the contrast reduces.

As a result, the display device which has no particle constrained layer 6 in the related art may not exhibit the excellent display performance.

In addition, once the white particles A and the black particles B have sunk, it is difficult to uniformly disperse the white particles A and the black particles B in the display layer 400 again, for example, the display may be reset once. For this reason, when the display may not be reset, it keeps displaying as the display characteristic is worsened, or when the display is reset for recovering the display characteristic, displaying is temporarily stopped, but convenience of the display device 20 is worsened.

The particle constrained layer 6 removes these problems. In other words, by preventing or suppressing the movement (sinking) of the white particles A and the black particles B toward the lower side in the vertical direction, the display device 20 exhibits the excellent display characteristic.

Hereinafter, the particle constrained layer 6 will be described in detail.

As shown in FIG. 1, the particle constrained layer 6 is provided in the display layer 400, the substrate 12 and the counter substrate 11 are fixed by a plurality of pillar members (fixing members) 8.

In addition, the particle constrained layer 6 has a function of suppressing the white particles A and the black particles B from moving in an in-plane direction of the display layer 400 while allowing the particles to move in a thickness direction of the display layer 400. Further, as to be described later, the function means that when a voltage is applied between the electrodes 3 and 4, the white particles A and the black particles B can move in the thickness direction of the display layer 400, and when the display device 20 is erected in the state where a voltage is not applied to the electrodes 3 and 4, the white particles A and the black particles B are suppressed from moving in a surface direction (the lower side in the vertical direction) of the display layer 400.

For this purpose, for example, the particle constrained layer 6 may have a different constraining force between the thickness direction and the plane direction of the display layer 400, that is, an anisotropic constraining force with respect to the particles. In this case, it may be sufficient that the particle constraining force in the plane direction of the display layer 400 is greater than that in the thickness direction. With the configuration as described above, the above-mentioned function can be exhibited more surely.

In addition, for example, the particle constrained layer 6 may have the same particle constraining force in the thickness direction and in the plane direction of the display layer 400. In this case, the particle constraining force of the particle constrained layer 6 may have strength by which the white particles A and the black particles B may not move in the particle constrained layer 6 by their own weight, but can move in the particle constrained layer 6 in a state where a predetermined voltage or more is applied between the electrodes 3 and 4. With the configuration as described above, the above-mentioned function can be exhibited more surely.

As the particle constrained layer 6 described above, but not limited to, any one of a porous body and a fiber aggregate is preferable if it has the above function. Therefore, the particle constrained layer 6 which is excellent in the above function and has a relatively simple configuration is obtained.

As a porous body, for example, a carbonaceous porous body such as carbon paper, carbon cloth, and carbon felt, a porous ceramic such as porous silica, porous alumina, and porous titania, a foam body such as polystyrene foam, urethane foam, polyimide foam, and zeolite are included. In addition, as a fiber aggregate, a fabric body which is formed by weaving a predetermined fiber, and a non-woven body which is formed without weaving predetermined fibers are exemplified.

In the embodiment, the particle constrained layer 6 is configured with an aggregate of the fibers 61a, and more specifically the non-woven body 61 which is formed without weaving the fibers 61a. Since the non-woven body 61 can be designed independently of a diameter of the fiber and a distance between the fibers, with the configuration of the particle constrained layer 6 using the non-woven body 61, the above-mentioned sinking of the white particles A and the black particles B can be effectively prevented or suppressed, without sacrificing ease of movement of the white particles A and the black particles B in the particle constrained layer 6.

As an average hole diameter of the non-woven body 61, it is not particularly limited to its size as long as the white particles A and the black particles B can move in the non-woven body 61 when an electric field is applied. Specifically, the average hole diameter preferably ranges from about one time to 10,000 times the average particle diameter of the white particles A and the black particles B, and more preferable from about two times to 1,000 times. With a large average hole diameter of the non-woven body 61, the white particles A and the black particles B can smoothly move in the particle constrained layer 6, and furthermore a used amount of the fibers 61a can relatively become much more. Therefore, as to be described later, the sinking of the white particles A and the black particles B can be effectively prevented or suppressed.

In this regard, when the average hole diameter of the non-woven body 61 is less than the above numerical values, the white particles A and the black particles B may be inhibited from moving through holes of the particle constrained layer 6, and switching between display states may become difficult. On the contrary, when the average hole diameter of the non-woven body 61 exceeds the above numerical values, the used amount of the fiber 61a which is used for the particle constrained layer 6 may become less, and the preventing performance of sinking the white particles A and the black particles B may be degraded.

Further, the average hole diameter of the non-woven body 61 is obtained by observing SEM of a cross section of the non-woven body 61. Specifically, the average hole diameter of the non-woven body 61 is obtained such that any 100 holes observed in the cross surface of the non-woven body 61 are measured and the average hole diameter of the respective holes is obtained.

In addition, a void ratio of the non-woven body 61 preferable ranges, but is not limited to, from about 20% to 60%, and more preferable from 30% to 50%. With this configuration, it is possible to secure sufficient migration paths for the particles (the white particles A and the black particles B). In addition, a used amount of the fibers 61a can relatively become much more, and the sinking of the white particles A and the black particles B can be effectively prevented or suppressed.

In addition, a volume density of the non-woven body 61 preferably ranges, but is not limited to, from about 1% to 30%. With this configuration, it is possible to secure sufficient migration paths for the particles (the white particles A and the black particles B).

As a fiber 61a, for example, a synthetic fiber such as polyester-based resin such as PET, polyarylate-based resin, polyacetal-based resin, arcrylic-based resin, polyamide-based resin, polyurethane-based resin, polyolefin-based resin, polyvinyl-based resin, polycarnonate-based resin, polyether-based resin, and polyphenylene-based resin can be included. In addition, an animal-derived fiber such as wool and rabbit hair can be exemplified. Furthermore, a plant-derived fiber which is extracted from trees or herbs, an inorganic fiber such as glass wool and asbestos, or a mineral fiber can be used. Above all these, a fiber made of polyester or polyamide is preferably used in view of strength, cost, and compatibility with liquid for electophoretic displaying.

In addition, the fiber 61a may be a single-core fiber called a monofilament fiber in addition to a multicore fiber called a multifilament fiber. In addition, the fiber 61a may be a composite material of the above-mentioned materials, or may be a composite fiber in which a plurality of fibers is more added.

A diameter of the fiber 61a is preferable to be small in consideration of all of the performances such as the display characteristic and responsiveness. Specifically, it preferably ranges from about 100 nm to 100 μm, and more preferably from about 1 μm to 50 μm.

In addition, a cross-sectional shape of the fiber 61a is preferably, but not limited to, a circular shape. With this configuration, the white particles A and the black particles B can smoothly move in the dispersion liquid 100.

The particle constrained layer 6 with the above-mentioned configuration is disposed so as to come in contact with the counter substrate 11 and to be separated from the substrate 12. With the disposed particle constrained layer 6 as described above, the following effects can be exhibited.

Firstly, since the particles (the white particles A and the black particles B) positioned in the particle constrained layer 6 can be regulated to move in a planar direction (which is a direction perpendicular to the thickness direction) of the display layer 400, it is possible to prevent or suppress the white particles A and the black particles B from sinking when the display device 20 is erected. For this reason, the display device 20 can exhibit an excellent display characteristic.

Secondly, since the particles (the white particles A or the black particles B) collected to the substrate 12 cover the particle constrained layer 6 such that the particle constrained layer 6 is not identified from the display surface 121, it is possible to prevent the particle constrained layer 6 having an adverse effect on displaying. For this reason, the display device 20 can exhibit an excellent display characteristic.

Thirdly, since the particle constrained layer 6 does not come in contact with the second electrode 4, the particles (the white particles A or the black particles B) can be collected over the entire surface of the second electrode 4. For this reason, almost the entire surface of the display surface 121 can become an effective display area, and the display device 20 can exhibit an excellent display characteristic.

A separated distance between the particle constrained layer 6 and the substrate 12 preferably ranges, but is not limited to, from about R to 5R where R represents the average particle diameter of the white particles A and the black particles 3, and more preferably from about 2R to 3R. In addition, the separated distance between the particle constrained layer 6 and the substrate 12 is not particularly limited so long as the above-mentioned numerical value range is satisfied. Specifically, the distance is preferably equal to or less than about 5 μm. Therefore, the above-mentioned effect exhibits remarkably.

The separated distance between the particle constrained layer 6 and the substrate 12 is held by a plurality of the pillar members 8. In other words, the respective pillar members 8 serve to fix the particle constrained layer 6 with respect to the substrate 12. Specifically, the respective pillar members 8 are provided in such a manner as to pass through the particle constrained layer 6, and the fiber 61a included in the particle constrained layer 6 becomes entangled with the pillar member 8, and thus the particle constrained layer 6 is fixed with respect to the substrate 12. Therefore, the above-mentioned effect exhibits more surely.

In addition, each of the pillar members 8 is provided in such a manner as to be extended in the thickness direction of the display layer 400, one end thereof is bonded with the substrate 12, and the other end is bonded with the counter substrate 11. Therefore, the pillar member 8 can be used as a reinforcing member which increases the strength of the display layer 400. Even when the display device 20 is bent and deformed, since the width of the display layer 400 can be kept virtually constant, an excellent display characteristic can be maintained.

In addition, it is preferable that a cross-sectional area of the pillar member 8 be small so long as its function is exhibited. Therefore, when it is viewed from the display surface 121, the pillar member 8 can be hardly seen. In addition, a cross-sectional shape of the pillar member 8 may be, for example, but not limited to, a circular shape, a triangular shape, or a rectangular shape.

In addition, in a plan view of the display device 20, the number of the pillar members 8 per 1 $cm^2$ (unit area) of the display layer 400 preferably ranges from about 1 to 5 even though it depends on the size and the like of the pillar member 8. In addition, the number of the pillar members 8 per the unit area of the display layer 400 may be uniform over the entire display layer 400, but it is preferable that the number in the center portion of the display layer 400 is larger than that in the peripheral portion of the display layer 400. Since the center portion of the display layer 400 has a larger bending degree (the amount of change) of the substrate 12 and the counter substrate 11 compared with the peripheral portion, the pillar members 8 are provided much more in the center portion of the display layer 400, so that the effect of the pillar members 8 is exhibited further more effectively. In addition, since the peripheral portion in which strength is secured more than the center portion by the sealing section 9 and the like is prevented from being excessively provided with the pillar members 8, it is possible to suppress a decrease of the display characteristic due to the pillar members 8.

As a constituent material of the pillar member 8, an insulating material is preferable, for example, polyolefin such as polyethylene, polypropylene, and ethylene-vinyl acetate copolymer, various kinds of thermoplastic elastomers such as modified polyolefin, polyamide (e.g.: nylon 6, nylon 66), styrene-based, polyvinyl chloride-based, polyurethane-based, polyester-based, fluorine-contained rubber-based, and chlorinated polyethylene-based, or a copolymer composed mainly thereof, a blend body, a polymer alloy are included. Further, a mixture containing one, two or more kinds thereof may be used.

In addition, the pillar member 8 can be formed simply, for example, such that a resin layer composed of polyethylene is formed on the second electrode 4 using various kinds of film formation methods, and the other places except places corresponding to the pillar members 8 of the resin layer are removed using various kinds of etching methods.

2. Driving Method of Display Device

The above-mentioned display device 20 is driven as follows.

When a voltage is applied between the electrodes 3 and 4, an electric field is generated therebetween. According to the electric field, each of the white particles A and the black particles B moves (electrophoresing) toward any one of the electrodes 3 and 4. Hereinafter, the case where positively charged particles are used as the white particles A and negatively charged particles are used as the black particles B will be described representatively. In addition, in the following, one pixel will be described representatively for convenience of explanation.

—White Display State—

When a voltage which has a positive potential in the first electrode 3 and a negative potential in the second electrode 4 is applied across the first electrode 3 and the second electrode 4, an electric field generated by the corresponding voltage application operates on the white particles A and the black particles B in the display layer 400. Then, as shown in FIG. 4A, the white particles A are electrophoresed toward the second electrode 4 to be collected in the second electrode 4, and the black particles B are electrophoresed toward the first electrode 3 to be collected in the first electrode 3. Therefore, it comes to be in the white display state in which the display surface 121 is shown with white.

At this time, since the white particles A which have been electrophoresed toward the display surface 121 are collected to the second electrode 4, the particle constrained layer 6 is covered by the white particles A when it is viewed from the display surface 121. Therefore, since the particle constrained layer 6 is not identified from the display surface 121, the particle constrained layer 6 is unlikely to affect a display image adversely.

Furthermore, in this state, when the display device 20 is erected, particles which come in contact with the second electrode 4 among the white particles A and the particles which are positioned in the vicinity of the second electrode 4 can be kept on their positions by absorption force with the second electrode 4. In addition, since these particles are irregularly and minutely moving in the dispersion medium 7 (Brownian movement), the particles can be kept in their own positions from a broad perspective.

On the other hand, as for particles which are relatively separated from the second electrode 4 among the white particles A, the above-mentioned absorption force does not operate thereon (or, even operating thereon, it is minute) and the particles tend to move (sinking) toward the lower side in the vertical direction by their own weight. However, as shown in FIG. 4B, such particles are constrained by the particle constrained layer 6 (that is, the particles are positioned in the particle constrained layer 6), such that the above-mentioned movement is prevented or suppressed. In addition, similarly the black particles B are also constrained by the particle constrained layer 6, such that the above-mentioned movement is prevented or suppressed.

According to the display device 20, since an involuntary movement of the white particles A collected to the second electrode 4 can be prevented or suppressed, the white display state with high reflectance can be maintained and high contrast can be exhibited. In addition, since the deviation of the particles in the display layer 400 can be effectively prevented or suppressed, a clear image without unevenness can be displayed in the display surface 121.

—Black Display State—

When a voltage which has a positive potential in the first electrode 3 and a negative potential in the second electrode 4 is applied across the first electrode 3 and the second electrode 4, an electric field generated by the corresponding voltage application operates on the white particles A and the black particles B in the display layer 400. Then, as shown in FIG. 5A, the white particles A are electrophoresed toward the first electrode 3 to be collected in the first electrode 3, and the black particles B is electrophoresed toward the second electrode 4 to be collected in the second electrode 4. Therefore, it comes to be in the black display state in which the display surface 121 is shown with black.

At this time, since the black particles B which have been electrophoresed toward the display surface 121 are collected to the second electrode 4, the particle constrained layer 6 is covered by the black particles B when it is viewed from the display surface 121. Therefore, since the particle constrained layer 6 is not identified from the display surface 121, the particle constrained layer 6 is unlikely to affect a display image adversely.

Furthermore, in this state, when the display device 20 is erected, particles which come in contact with the second electrode 4 among the black particles B and the particles which are positioned in the vicinity of the second electrode 4 can be kept on their positions by absorption force with the second electrode 4. In addition, since these particles are irregularly and minutely moving in the dispersion medium 7 (Brownian movement), the particles can be kept in their own positions from a broad perspective.

On the other hand, as for particles which are relatively separated from the second electrode 4 among the black particles B, the above-mentioned absorption force does not operate thereon and the particles tend to move (sinking) toward the lower side in the vertical direction by their own weight. However, as shown in FIG. 5B, such particles are constrained by the particle constrained layer 6 (that is, the particles are positioned in the particle constrained layer 6), such that the above-mentioned movement is prevented or suppressed. In addition, similarly the white particles A are also constrained by the particle constrained layer 6, such that the above-mentioned movement is prevented or suppressed.

According to the display device 20, since an involuntary movement of the black particles B collected to the second electrode 4 can be prevented or suppressed, the black display state with low reflectance can be maintained and high contrast can be exhibited. In addition, since the deviation of the particles in the display layer 400 can be effectively prevented or suppressed, a clear image without unevenness can be displayed in the display surface 121.

In the display device 20, the white display state or the black display state in each pixel is selected, that is, pixels in the white display state and pixels in the black display state are combined, so that a desired image can be displayed in the display surface 121.

Particularly, in the embodiment, since the average particle diameter of the white particles A is the same as that of the black particles B, the same effect described above can be exhibited by the pixels in the white display state and the pixels in the black display state. For this reason, the display characteristic of the display device 20 is improved further.

Second Embodiment

FIG. 6 is a cross-sectional view illustrating the display device according to the second embodiment of the invention.

Hereinafter, the second embodiment will be described focusing on differences from the above-mentioned embodiment, and the description on the same contents will be omitted.

The display device according to the second embodiment of the invention is the same as the display device according to the first embodiment except the arrangement of the particle constrained layer. Further, the same components as those in the first embodiment described above are designated by the same reference numerals.

As shown in FIG. 6, the particle constrained layer 6 according to the embodiment is disposed so as to be separated from the counter substrate 11. It is preferable that a separated distance between the particle constrained layer 6 and the counter substrate 11 is substantially the same as that between the particle constrained layer 6 and the substrate 12, but the invention is not limited thereto. In other words, when the average particle diameter of the white particles A and the black particles B is denoted by R, it preferably ranges from about R to 5R, and more preferably from about 2R to 3R. In addition, the separated distance between the particle constrained layer 6 and the counter substrate 11 is not preferably limited so long as the above-mentioned numerical value range is satisfied. Specifically, the distance is preferably equal to or less than about 5 µm.

As a result, when the display device 20 is erected, the sinking of the black particles B toward the first electrode 3 can be effectively prevented or suppressed and the following effects can be exhibited. For example, when the display device 20 is kept in the erecting state for a long time or when a strong impact or vibration is applied to the display device 20, the white particles A and the black particles B may be biased in the display layer 400. In this case, in order to cause the white particles A and the black particles B to be in a uniformly dispersed state, it is necessary that a refresh voltage is applied to the display layer 400 and the white particles A and the black particles B move in the horizontal direction (which is a direction perpendicular to the thickness direction of the display layer 400). For this purpose, if a gap is formed between the particle constrained layer 6 and the counter substrate 11 as well as between the particle constrained layer 6 and the substrate 12, the movement of the white particles A and the black particles B in the horizontal direction as described above can be smoothly performed. Further, as the refresh voltage, for example, a voltage in which a state where a positive voltage is applied to a predetermined first electrode 3 and a negative voltage is applied to the other first electrodes 3 and the opposite state thereof repeatedly and alternately is included.

Third Embodiment

Figure 7:
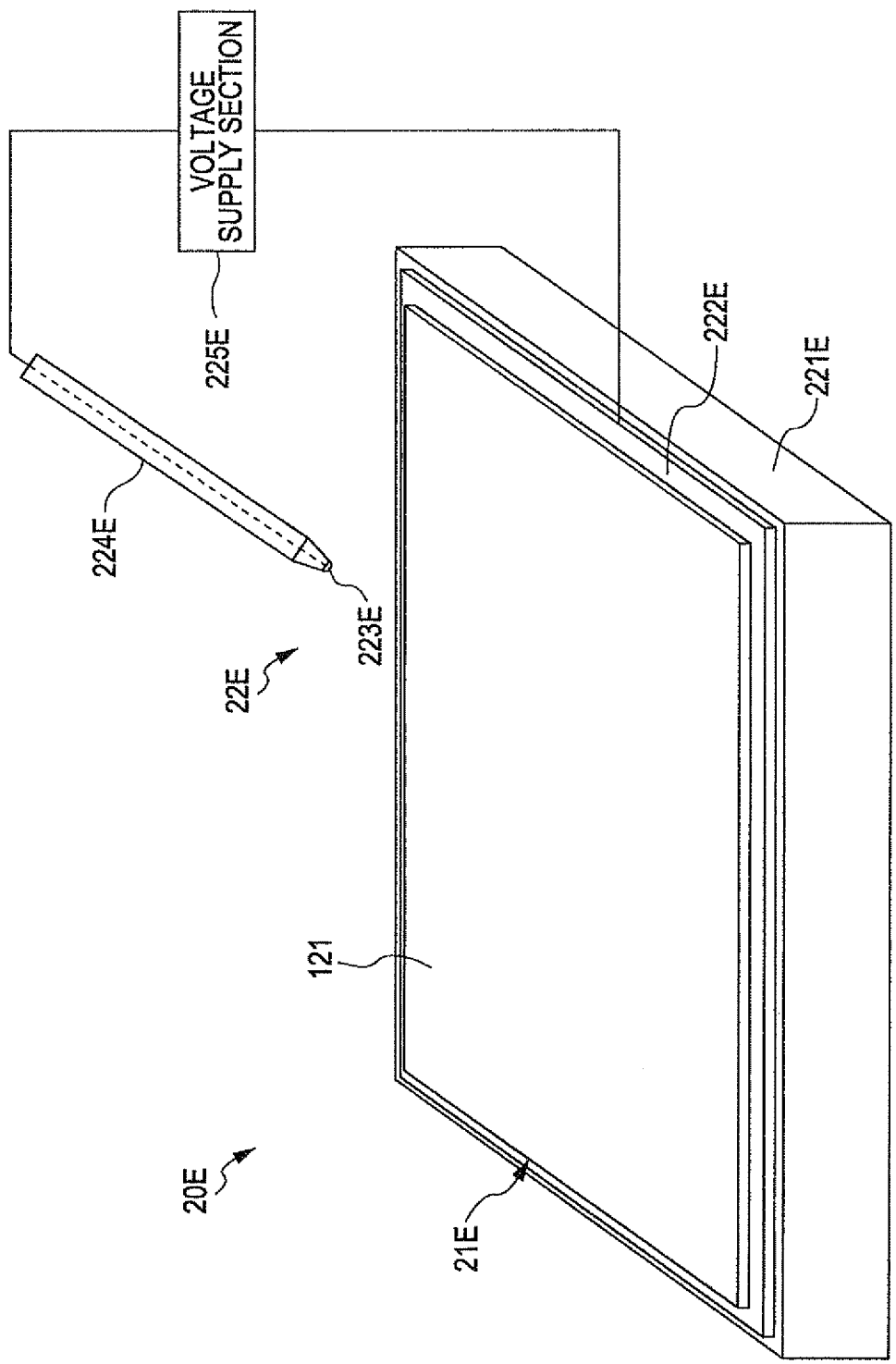
FIG. 7 is a perspective view schematically illustrating a display device according to a third embodiment of the invention.
Figure 8:
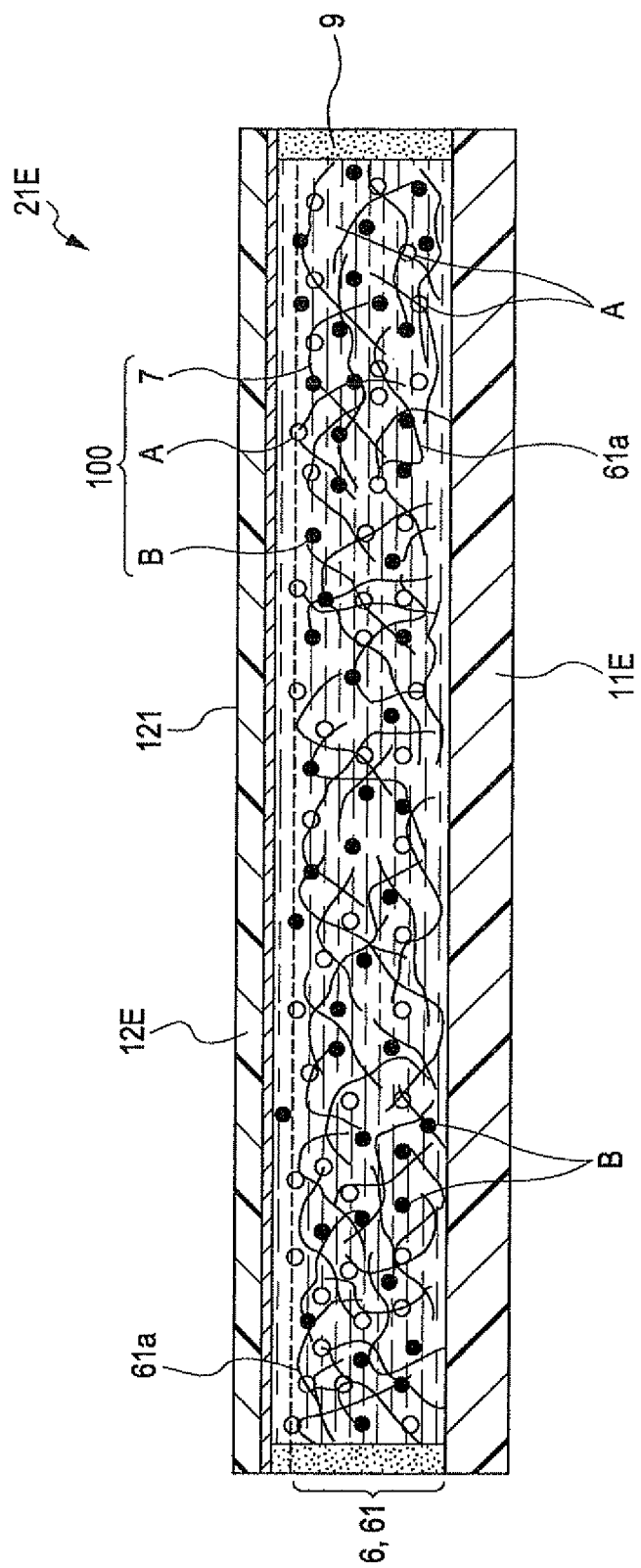
FIG. 8 is a cross-sectional view of a display sheet device shown in FIG. 7.

FIG. 7 is a perspective view schematically illustrating the display device according to the third embodiment of the invention, and FIG. 8 is a cross-sectional view illustrating the display device shown in FIG. 7.

Hereinafter, the third embodiment will be described focusing on differences from the above-mentioned embodiment, and the description on the same contents will be omitted.

The display device according to the third embodiment of the invention is the same as the display device according to the first embodiment except that the display sheet is configured as a separated body.

As shown in FIG. 7, a display device 20E according to the embodiment includes a display sheet 21E and a writing device 22E.

The display sheet 21E, as shown in FIG. 8, includes a substrate (first substrate) 12E, a substrate (second substrate) 11E which is disposed to face the substrate 12E, the display layer 400 which is provided between the substrates 12E and 11E, the particle constrained layer 6 which is provided in the display layer 400, and the sealing section 9 which seals the display layer 400. Since the respective substrates 12E and 11E have the same configuration as that of the base section 2 of the substrate 12 according to the first embodiment, the description thereof will be omitted.

The writing device 22E is a device which is used for writing a desired image (shape, color, character, picture, or a combination thereof, etc.) to the display sheet 21E. As shown in FIG. 7, the writing device 22E includes a base 221E, a sheet-like common electrode 222E which is provided on the base 221E, a writing pen (input tool) 224E which has a partial electrode 223E at the front end, and a voltage application section 225E which applies a voltage between the common electrode 222E and the partial electrode 223E.

The display device 20E is used, for example, as follows.

First, in the entire area of the display surface 121, the display sheet 21E of the white display state is mounted on the common electrode 222E of the writing device 22E while the display surface 121 is disposed to be upward. Next, the voltage application section 225E applies a voltage between the common electrode 222E and the partial electrode 223E so that the partial electrode 223E becomes a low potential. In this state, by moving the writing pen 224E along a desired locus while placing it on the display surface 121, the particles are electrophoresed in an area corresponding to the locus and a display color is changed from white to black.

According to the display device 20E, a desired character and the like can be drawn on the display surface 121 of the display sheet 21E with the same feeling when drawing the character and the like on a piece of paper using a pencil. For this reason, operability (operation feeling) of the display device 20E is improved.

Each of the display devices 20 as described above can be assembled in various kinds of electronic apparatuses. As the electronic apparatus according to the invention including the electrophoresis display device, for example, an electronic paper, an electronic book, a television, a viewfinder type and a monitor direct-view type of video tape recorder, a car navigation device, a pager, an electronic notepad, an electronic calculator, an electronic newspaper, a word processor, a personal computer, a workstation, video telephone, a POS terminal, and an apparatus provided with a touch panel can be included.

Among these electronic apparatuses, the electronic paper will be specifically described as an example.

Figure 9:
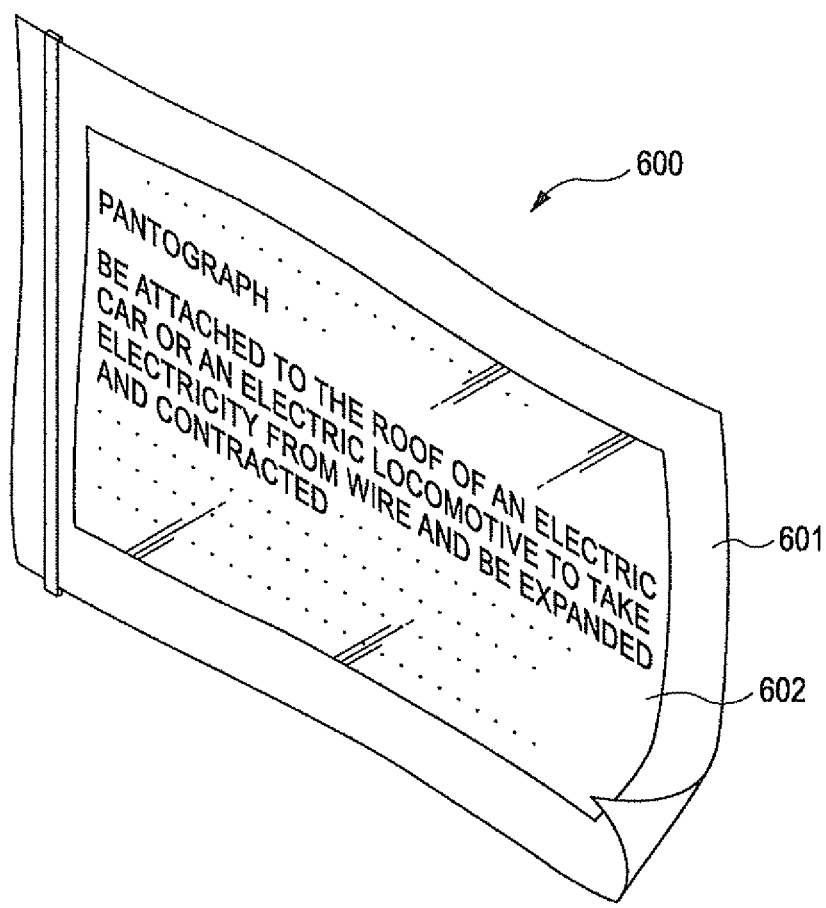
FIG. 9 is a perspective view illustrating an embodiment in a case where an electronic apparatus according to the invention is applied to an electronic paper.

FIG. 9 is a perspective view illustrating the embodiment in the case where the electronic apparatus according to the invention is applied to the electronic paper.

The electronic paper 600 shown in FIG. 9 includes a main body 601 which is configured with a rewritable sheet having the same texture and flexibility as those of paper and a display unit 602. In the electronic paper 600, the display unit 602 is configured with the above-mentioned display device 20.

Next, an embodiment in a case where the electronic apparatus according to the invention is applied to the display will be described.

Figure 10A:
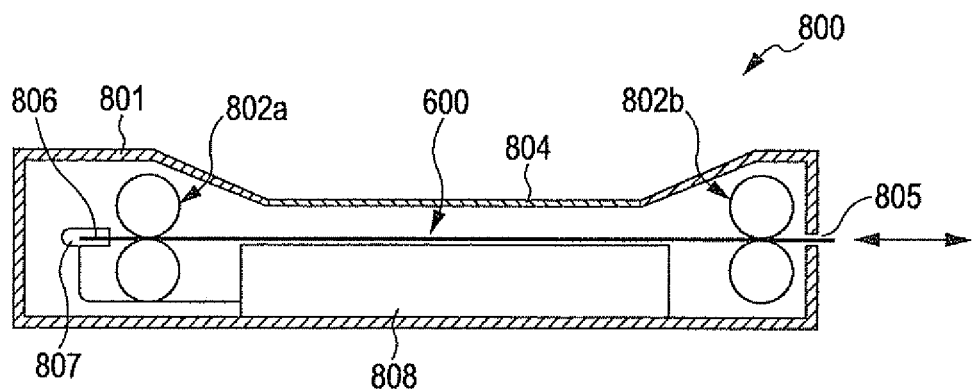
FIGS. 10A and 10B are diagrams illustrating an embodiment in which an electronic apparatus according to the invention is applied to a display.
Figure 10B:
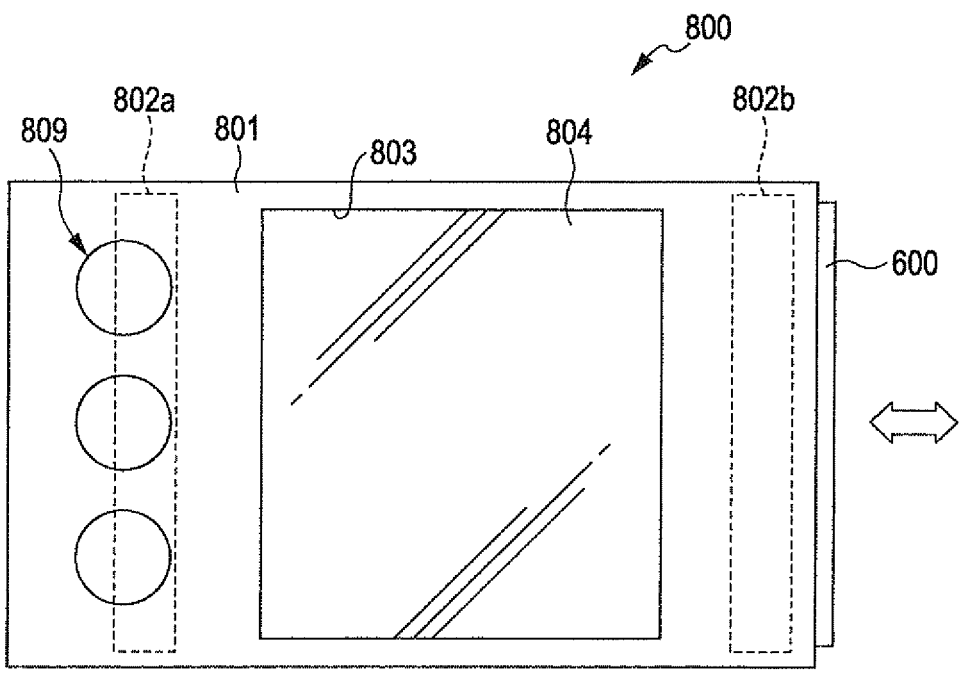

FIGS. 10A and 10B are diagrams illustrating the embodiment in the case where the electronic apparatus according to the invention is applied to the display. In the drawing, FIG. 10A is a cross-sectional view and FIG. 103 is a plan view.

The display (display device) 800 shown in FIGS. 10A and 103 includes a body section 801 and an electronic paper 600 which is provided such a manner as to be freely attached or detached with respect to the body section 801. Further, the electronic paper 600 has the same configuration described above, that is, the configuration shown in FIG. 9.

The body section 801 has an insertion port 805 which is formed on a side portion thereof (the right side in FIG. 10A) and allows the electronic paper 600 to be inserted, and is provided therein with two pairs of transport roller pairs 802a and 802b. When the electronic paper 600 is inserted into the body section 801 via the insertion port 805, the electronic paper 600 is provided in the body section 801 in a state of being interposed by the transport roller pairs 802a and 802b.

In addition, a rectangular hole section 803 is formed on the side of the display surface of the body section 801 (the front side of the paper in FIG. 10B). In the hole section 803, a transparent glass plate 804 is fitted. With this configuration, the electronic paper 600 which is in a state of being provided in the body section 801 can be identified from the outside of the body section 801. In other words, in the display 800, the display surface is configured such that the electronic paper 600 in a state of being provided in the body section 801 is identified in the transparent glass plate 804.

In addition, a terminal section 806 is provided on the leading end portion in the insertion direction of the electronic paper 600 (the left side in FIG. 10A), and in the body section 801, a socket 807 is provided such that the electronic paper 600 is connected with the terminal section 806 in a state of being provided in the body section 801. In the socket 807, the controller 808 is electrically connected with the operation section 809.

In the display 800, the electronic paper 600 is provided in such a manner as to be freely attached or detached with respect to the body section 801, so that the electronic paper 600 can be used in a state of being detached from the body section 801. As a result, convenience is improved.

Hereinbefore, the display sheet, the display device and the electronic apparatus according to the invention have been described based on the embodiments illustrated herein, but the invention is not limited thereto and the configuration of each section can be replaced with an arbitrary configuration having the same function. In addition, the invention may be added with another arbitrary component. In addition, the respective embodiments may be combined appropriately.

In addition, in the above-mentioned embodiment, the white particles A and the black particles B are described as the charged particles which are charged with polarities opposite to each other, but the invention is not limited thereto. For example, either of the white particles A or the black particles B may be the charged particles which are charged positively or negatively, and the other are non-charged particles which are substantially not charged. In this case, when the average particle diameter of the particles which are charged among the white particles A and the black particles B is denoted by R, it is preferable that the gap between the particle constrained layer 6 and the substrate 12 satisfies the numerical value range from 1R to 5R. Since the non-charged particles are kept in the state where the particles are dispersed in the dispersion medium regardless of the existence of the electric field or an attitude of the display device, the above-mentioned sinking of the particles is barely occurs. For this reason, it is sufficient that the sinking of the charged particles is prevented.

In addition, the average particle diameter of the non-charged particles is preferably larger than the gap of the particle constrained layer 6 and the substrate 12. Therefore, the non-charged particles can be surely prevented from moving between pixels.

In addition, in this case, it is preferable that the black particles are assumed as the charged particles and the white particles are assumed as the non-charged particles. In this case, if the black particles are collected to the first electrode, they are in the white display state, and if collected to the second electrode, they are in the black display state. In addition, by dispersing the white particles, light can be reflected and dispersed from the display surface 121 further more efficiently, and can display a white color with higher reflectance.

In addition, in the above-mentioned embodiment, the average particle diameters of the white particles and the black particles have been described as the same as each other, but the invention is not limited thereto and the average particle diameters may be different from each other. In this case, when the average particle diameter of the particles which have a smaller average particle diameter among the white particles A and the black particles B is denoted by R, it is preferable that the gap between the particle constrained layer 6 and the substrate 12 satisfies the numerical value range from 1R to 5R.

In addition, in the above-mention embodiment, the configuration in which the pillar member is used as the fixing member has been described, but the fixing member is not limited thereto and may be, for example, a spacer which is configured with particles such as glass beads. Even by disposing the spacer between the substrate 11 and the particle constrained layer 6, a gap of a predetermined size can be formed between the substrate 11 and the particle constrained layer 6.

EXAMPLES

Next, specific examples according to the invention will be described. However, the invention is not limited to these examples.

1. Manufacturing of the Display Device

Example 1

<1> First, titanium-oxide particles and titanium black particles were prepared as the white particles and the black particles, respectively. Then, these particles were dispersed in dimethylsilicone oil (dispersion medium) to prepare the dispersion liquid. Further, surfaces of the titanium-oxide particles and the titanium black particles were subject to being graft modified such that the particles were charged with the reverse polarity to each other. The average particle diameter of the titanium-oxide particles and the titanium black particles was 50 nm together.

<2> Next, a PET-ITO substrate in which an electrode (second electrode) composed of an ITO was formed was prepared. Next, a resin layer composed of polyethylene was formed on the electrode. Next, after masks were formed on places corresponding to the pillar members of the resin layer, the resin layer was etched, so that the pillar members were formed to be protruded from the PET-ITO substrate. Next, the sealing section composed of an epoxy-based adhesive was formed on the peripheral portion (outer peripheral portion) of the PET-ITO substrate.

<3> Next, on a concave portion which was formed with the PET-ITO substrate and the sealing section, the particle constrained layer 6 was disposed to be separated from the PET-ITO substrate by 50 nm, and thereafter the dispersion liquid was supplied in the concave portion to fill the concave portion with the dispersion liquid. As a result, the display layer was obtained. Next, a circuit substrate on which separate electrodes composed of ITO were formed was disposed on the display layer, and thereafter the sealing section was bonded with the respective pillar members using a roll laminator, so that the display device was obtained.

Further, as the particle constrained layer, a non-woven body which was formed without weaving the fiber composed of polyethylene was used. An average hole diameter of the non-woven body was 1,500 nm (that is, 30 times the average particle diameter of the white particles).

The display device as obtained above had a gap of 50 nm between the particle constrained layer and the PET-ITO substrate.

Example 2

Except the gap between the particle constrained layer and the PET-ITO substrate being 100 nm, the display device of Example 2 was obtained similarly to Example 1.

Example 3

Except the gap between the particle constrained layer and the PET-ITO substrate being 150 nm, the display device of Example 3 was obtained similarly to Example 1.

Example 4

Except the gap between the particle constrained layer and the PET-ITO substrate being 200 nm, the display device of Example 4 was obtained similarly to Example 1.

Example 5

Except the gap between the particle constrained layer and the PET-ITO substrate being 250 nm, the display device of Example 5 was obtained similarly to Example 1.

Example 6

Except the gap between the particle constrained layer and the PET-ITO substrate being 300 nm, the display device of Example 6 was obtained similarly to Example 1.

Example 7

Except the gap between the particle constrained layer and the PET-ITO substrate being 350 nm, the display device of Example 7 was obtained similarly to Example 1.

Comparative Example 1

Except the particle constrained layer being omitted, the display device of Comparative Example 1 was obtained similarly to Example 1.

Comparative Example 2

Except the particle constrained layer being in contact with the PET-ITO substrate, the display device of Comparative Example 2 was obtained similarly to Example 1.

2. Evaluation (2-1) Identification of the Particle Constrained Layer

Regarding each of Examples and each of Comparative Examples, after the entire area of the display surface came to be in the white display state, it was observed whether or not the particle constrained layer was identified from the display surface using a digital microscope (Product Name: VHX-600, made by Keyence Co.) and a lens (Product Name: VH-Z100, made by Keyence Co.). These measurement results are shown in the following Table 1.

TABLE 1

|  | Identification of the particle constrained layer |
|---|---|
| Example 1 | NO |
| Example 2 | NO |
| Example 3 | NO |
| Example 4 | NO |
| Example 5 | NO |
| Example 6 | NO |
| Example 7 | NO |
| Comparative Example 1 | — |

TABLE 1-continued

|  | Identification of the particle constrained layer |
|---|---|
| Comparative Example 2 | YES |

As shown in Table 1, in the display device of each of Examples 1 to 7, the white particles (titanium-oxide particles) were positioned between the PET-ITO substrate and the particle constrained layer and the particle constrained layer was covered with the white particles. Therefore, in each of Examples 1 to 7, it was confirmed that the particle constrained layer did not have an effect on an image displayed in the display surface.

On the contrary, in Comparative Example 2, the particle constrained layer was not covered with the white particles and the particle constrained layer could be identified. In other words, in Comparative Example 2, it was confirmed that the particle constrained layer had an effect on the image display in the display surface. Further, as for Comparative Example 1, since the particle constrained layer was omitted, the evaluation was omitted.

(2-2) Measurement of Reflectance

Regarding every Example and every Comparative Example, reflectance was measured when the entire area of the display surface was in the white display state. The measurement of the reflectance was performed since 3 seconds elapsed after switching to the white display state was completed. Further, the reflectance of the display color of each of the display device was a ratio of a reflection quantity of the display color of the display device when the reflection quantity of the reference white color (standard sample) was 100. In addition, the measurement of the reflectance was performed using a color luminance meter ("BM-5A" made by Topcon Co.).

In addition, regarding every Example and every Comparative Example, the reflectance was measured when the entire area of the display surface was in the black display state. The measurement was performed similar to the measurement of the reflectance of the white display state.

The above obtained reflectance in every Example and every Comparative Example is shown in Table 2.

TABLE 2

|  | White Color Reflectance [%] | Black Color Reflectance [%] |
|---|---|---|
| Example 1 | 58.3 | 2.2 |
| Example 2 | 58.6 | 1.6 |
| Example 3 | 59.2 | 1.5 |
| Example 4 | 59.2 | 1.5 |
| Example 5 | 59.6 | 1.1 |
| Example 6 | 59.5 | 1.0 |
| Example 7 | 59.1 | 1.0 |
| Comparative Example 1 | 59.4 | 1.0 |
| Comparative Example 2 | 54.8 | 4.2 |

As shown in Table 2, the reflectance of white which was measured in the display devices of Examples 1 to 7 was comparable to the reflectance measured in the display device of Comparative Example 1. In other words, in Examples 1 to 7, it was confirmed that an adverse effect of the particle constrained layer on white displaying was effectively prevented (suppressed).

On the contrary, the reflectance of white which was measured in the display device of Comparative Example 2 was less than the reflectance which was measured in the display device of Comparative Example 1. Further, it was confirmed that the particle constrained layer had an adverse effect on white color displaying.

The reflectance of black which was measured in the display devices of Examples 1 to 7 was comparable to the reflectance measured in the display device of Comparative Example 1. In other words, in Examples 1 to 7, it was confirmed that an adverse effect of the particle constrained layer on black displaying was effectively prevented (suppressed).

On the contrary, the reflectance of black which was measured in the display device of Comparative Example 2 was higher than the reflectance which was measured in the display device of Comparative Example 1. Further, it was confirmed that the particle constrained layer had an adverse effect on black displaying.

(2-3) Measurement of Reflectance

Regarding every Example and every Comparative Example, the reflectance was measured when in a state where the entire area of the display surface was in the white display state and voltage application was stopped, the display device was left erected for 10 minutes so as to be in a direction parallel with the vertical direction. In addition, the measurement of the reflectance was performed on an area on the upper side of the display surface in the vertical direction (that is, the area where some concerns about the reduction of the particles in number is present due to the sinking of the particles).

In addition, regarding every Example and every Comparative Example, the reflectance was measured when in a state where the entire area of the display surface was in the black display state and voltage application was stopped, the display surface was left erected for 10 minutes in a direction parallel with the vertical direction.

In addition, the measurement of the reflectance was performed similar to that of (2-2) described above.

The above obtained reflectance in every Example and every Comparative Example is shown in Table 3.

TABLE 3

|  | White Reflectance [%] | Black Reflectance [%] |
|---|---|---|
| Example 1 | 58.3 | 2.2 |
| Example 2 | 58.6 | 1.6 |
| Example 3 | 59.2 | 1.5 |
| Example 4 | 59.2 | 1.5 |
| Example 5 | 59.0 | 1.5 |
| Example 6 | 58.6 | 1.8 |
| Example 7 | 58.1 | 2.0 |
| Comparative Example 1 | 50.4 | 8.1 |
| Comparative Example 2 | 54.6 | 4.2 |

As shown in Table 3, the reflectance of white which was measured in the display devices of Examples 1 to 7 was slightly different from the reflectance which was measured in (2-2) described above. In particular, regarding Examples 2 to 4, there was almost no variation. Therefore, it was confirmed that the movement (sinking) of the white particles toward the lower side in the vertical direction was prevented by the particle constrained layer.

In contrast, the reflectance of white which was measured in the display device of Comparative Example 1 in which the particle constrained layer was omitted was slightly decreased from the reflectance which was measured in (2-2) described above. Therefore, in the display device without the particle constrained layer, it was confirmed that the sinking of the white particles occurred.

In addition, as shown in Table 3, the reflectance of black which was measured in the display devices of Examples 1 to 7 was slightly different from the reflectance which was measured in (2-2) described above. In particular, regarding Examples 2 to 4, there was almost no variation. Therefore, it was confirmed that the movement (sinking) of the black particles toward the lower side in the vertical direction was prevented by the particle constrained layer.

In contrast, the reflectance of black which was measured in the display device of Comparative Example 1 in which the particle constrained layer was omitted was slightly increased from the reflectance which was measured in (2-2) described above. Therefore, in the display device without the particle constrained layer, it was confirmed that the sinking of the black particles occurred.

The entire disclosure of Japanese Patent Application No. 2010-237887, filed Oct. 22, 2010 is expressly incorporated by reference herein.

What is claimed is:

1. A display sheet comprising:
   a first substrate which is provided on a side of a display surface;
   a second substrate which is disposed to face the first substrate;
   a display layer which is provided between the first substrate and the second substrate and filled with a dispersion liquid in which at least one kind of particle is dispersed in a dispersion medium, the particles being charged positively or negatively; and
   a particle constrained layer which is provided in the display layer,
   wherein the particle constrained layer is provided to be separated from the first substrate; and
   a separated distance between the particle constrained layer and the first substrate is equal to or more than one time and equal to or less than five times an average particle diameter of the particles.

2. The display sheet according to claim 1, wherein the particle constrained layer is provided to be separated from the second substrate.

3. The display sheet according to claim 2, wherein a separated distance between the particle constrained layer and the second substrate is equal to or more than one time and equal to or less than five times an average particle diameter of the particles.

4. The display sheet according to claim 1, further comprising a fixing member which is provided in the display layer and fixes the particle constrained layer to the first substrate.

5. The display sheet according to claim 4, wherein the fixing member is in a pillar shape in such a manner as to be extended in a thickness direction of the display layer.

6. The display sheet according to claim 4, wherein the number of fixing members per unit area of the display layer is larger in the center portion rather than in a peripheral portion of the display layer.

7. The display sheet according to claim 1, wherein the particle constrained layer includes at least one of a porous body, a network structure body, and a fiber aggregate.

8. The display sheet according to claim 1, wherein the particle constrained layer suppresses the particles from moving in an in-plane direction of the display layer while allowing the particles to move in a thickness direction of the display layer.

9. The display sheet according to claim 1, wherein the dispersion liquid includes first particles, which are charged positively or negatively and second particles which are charged with polarities opposite to the first particles, and
   wherein average particle diameters of the first particles and the second particles are substantially the same.

10. A display device comprising the display sheet according to claim 1.

11. An electronic apparatus comprising the display device according to claim 10.

12. A display sheet comprising:
    a first substrate which is provided on a side of a display surface;
    a second substrate which is disposed to face the first substrate;
    a display layer which is provided between the first substrate and the second substrate and filled with a dispersion liquid in which at least one kind of particle is dispersed in a dispersion medium, the particles being charged positively or negatively;
    a particle constrained layer which is provided in the display layer;
    wherein the particle constrained layer is provided to be separated from the first substrate; and
    a fixing member which is provided in the display layer and fixes the particle constrained layer to the first substrate, the fixing member being in a pillar shape extending in a thickness direction of the display layer,
    wherein a separated distance between the particle constrained layer and the first substrate is equal to or more than one time and equal to or less than five times an average particle diameter or the particles.

13. The display sheet according to claim 12, wherein the particle constrained layer is provided to be separated from the second substrate.

14. The display sheet according to claim 13, wherein a separated distance between the particle constrained layer and the second substrate is equal to or more than one time and equal to or less than five times an average particle diameter of the particles.

15. The display sheet according to claim 12, wherein the number of fixing members per unit area of the display layer is larger in the center portion rather than in a peripheral portion of the display layer.

* * * * *